(12) United States Patent
Yu et al.

(10) Patent No.: US 8,597,738 B2
(45) Date of Patent: Dec. 3, 2013

(54) FABRICATION OF SINGLE-CRYSTALLINE GRAPHENE ARRAYS

(76) Inventors: Qingkai Yu, Austin, TX (US); Shin-Shem Pei, Houston, TX (US)

( * ) Notice: Subject to any disclaimer, the term of this patent is extended or adjusted under 35 U.S.C. 154(b) by 172 days.

(21) Appl. No.: 13/270,766

(22) Filed: Oct. 11, 2011

(65) Prior Publication Data

US 2012/0088039 A1   Apr. 12, 2012

Related U.S. Application Data

(60) Provisional application No. 61/391,866, filed on Oct. 11, 2010.

(51) Int. Cl.
*C23C 14/30* (2006.01)

(52) U.S. Cl.
USPC ... 427/596; 427/240; 427/249.1; 427/249.12; 427/307

(58) Field of Classification Search
USPC .................. 427/596, 240, 249.1, 249.12, 307
See application file for complete search history.

(56) References Cited

U.S. PATENT DOCUMENTS

| | | | | |
|---|---|---|---|---|
| 7,619,257 | B2 * | 11/2009 | Pfeiffer | 257/76 |
| 7,772,059 | B2 * | 8/2010 | Parikh et al. | 438/198 |
| 8,236,118 | B2 * | 8/2012 | Veerasamy | 156/150 |
| 8,309,438 | B2 * | 11/2012 | Colombo et al. | 438/478 |
| 2009/0047520 | A1 | 2/2009 | Lee | |
| 2009/0181502 | A1 * | 7/2009 | Parikh et al. | 438/164 |
| 2010/0003462 | A1 | 1/2010 | Kamins | |
| 2010/0021708 | A1 | 1/2010 | Kong | |
| 2010/0247801 | A1 | 9/2010 | Zenasni | |
| 2010/0255984 | A1 * | 10/2010 | Sutter et al. | 502/185 |
| 2011/0031104 | A1 * | 2/2011 | Barker et al. | 204/157.2 |
| 2012/0048181 | A1 * | 3/2012 | Barker et al. | 117/94 |
| 2012/0141799 | A1 * | 6/2012 | Kub et al. | 428/408 |

FOREIGN PATENT DOCUMENTS

| WO | 0200644 A1 | 1/2002 |
|---|---|---|
| WO | WO 2010065518 | 6/2010 |

OTHER PUBLICATIONS

Van der Zande, Arend M., et al., "Large-Scale Arrays of Single-Layer Graphene Resonators". Nano Letters 2010, 10, 4869-4873.*
Xue, Yunzhou, et al., "Low Temperature Growth of Highly Nitrogen-Doped Single Crystal Graphene Arrays by Chemical Vapor Deposition". Journal of the American Chemical Society, 2012, 134, 11060-11063.*
Wu, Wei, et al., "Growth of Single Crystal Graphene Arrays by Locally Controlling Nucleation on Polycrystalline Cu Using Chemical Vapor Deposition". Advanced Materials, 2011, 23, 4898-4903.*
Yu, Qingkai, et al., "Control and characterization of individual grains and grain boundaries in graphene grown by chemical vapor deposition". Nature Materials, vol. 10, Jun. 2011, pp. 443-449.*
Li, Xuesong, et al., "Large-Area Graphene Single Crystals Grown by Low-Pressure Chemical Vapor Deposition of Methane on Copper". Journal of the American Chemical Society, 2011, 133 (9), 2816-2819.*
Iwasaki, Takayuki, et al., "Long-Range Ordered Single-Crystal Graphene on High-Quality Heteroepitaxial Ni Thin Films Grown on MgO(111)". Nano Letters 2011, 11, 79-84.*
Adv. Mater. 2001, 23, 4989-1903 (Wei Wu et al.) Sep. 23, 2011.
A.K. Geim, Graphene: Status and Prospects, Science, 324 (2009) 1530-1534.
X.S. Li, W.W. Cai, J.H. An, S. Kim, J. Nah, D.X. Yang, R. Piner, A. Velamakanni, I. Jung, E. Tutuc, S.K. Banerjee, L. Colombo, R.S. Ruoff, Large-Area Synthesis of High-Quality and Uniform Graphene Films on Copper Foils, Science, 324 (2009) 1312-1314.
K.V. Emtsev, A. Bostwick, K. Horn, J. Jobst, G.L. Kellogg, L. Ley, J.L. McChesney, T. Ohta, S.A. Reshanov, J. Rohrl, E. Rotenberg, A.K. Schmid, D. Waldmann, H.B. Weber, Seyller, Towards wafer-size graphene layers by atmospheric pressure graphitization of silicon carbide, Nature Materials, 8 (2009) 203-207.
H.Cao, Q.Yu, L.A. Jauregui, J.Tian, W.Wu, Z.Liu, R.Jalilian, D.K. Benjamin, Z.Jiang, J.Bao, S. S. Pei and Yong P. Chen "Electronic Transport in Chemical Vapor Deposited Grapherie Synthesized on Cu: Quantum Hail Effect and Weak Localization", Applied Physics Letters, 96, 122106 (2010).
S. Bae, H. Kim,Y. Lee, X.F. XU, J.S. Park,Y. Zheng, J. Balakrishnan, T. Lei, H.R. Kim, Y.I. Song, Y.J. Kim, K.S. Kim, B. Ozyilmaz, J.H. Ahn, S.H. Hong, S. Iijima, Roll-to-roll producton of 30-inch graphene films for transparent electrodes, Nature Nanotechnology, 5 574-578.
Yong P. Chen and Qingkai Yu, "Graphene rolls off the press", Nature Nanotechnology 5, 559 (2010).
M. Vanin, J.J. Mortensen, A.K. Kelkkanen, J.M. Garcia-Lastra, K.S. Thygesen, K.W. Jacobsen, Graphene on metals: A van der Waals density functional study, Physical Reviw B, 81.

* cited by examiner

*Primary Examiner* — Bret Chen

(57) ABSTRACT

The synthesis of ordered arrays of GSC's by re-growth from pre-patterned seed crystals that offer an approach for scalable fabrication of single crystal graphene devices while avoiding domain boundaries is demonstrated herein. Each graphene island is a single crystal and every graphene island is of similar size. The size of graphene island arrays can be as small as less than 1 mm$^2$ or as large as several m$^2$. The distance between each GSC island is also adjustable from several micrometers to millimeters. All of the graphene islands are addressable for devices and electrical circuit fabrication.

17 Claims, 7 Drawing Sheets

FABRICATION OF SINGLE-CRYSTALLINE GRAPHENE ARRAYS

CROSS-REFERENCE TO RELATED APPLICATIONS

This applications claims priority to U.S. Provisional Patent Application Ser. No. 61/391,866, filed Oct. 14, 2010, which is hereby incorporated by reference for all purposes.

FIELD

The present disclosure relates to methods for the fabrication of graphene single crystal islands, and arrays thereof, on a polycrystalline substrate. More specifically, the present disclosure teaches the synthesis of ordered arrays of single crystals made of graphene by the re-growth from pre-patterned seed crystals, offering an approach for the scalable fabrication of single crystal graphene devices while avoiding domain boundaries.

BACKGROUND

Graphene, a single atomic layer of hexagonally packed carbon atoms, has drawn significant attention with its outstanding electrical, mechanical, and chemical properties. Various promising applications based on graphene have been demonstrated, such as in electronics, optoelectronics, and chemical/bio sensing. To further the development of graphene technology, it is desirable to synthesize high quality graphene on a large scale. Since the first mechanical isolation of graphene from graphite crystals, intense efforts have been made to develop methods for graphene synthesis, including reduction of graphene oxide, thermal decomposition of SiC, and transition metal assisted chemical vapor deposition (CVD) processes. In particular, graphene synthesized by CVD on Cu substrates has shown great promise owing to its large size, high quality, and transferability to arbitrary substrates.

So far, CVD graphene films have been polycrystalline, consisting of numerous grain boundaries. Typical known processes of graphene synthesis on Cu start with the nucleation of individual graphene grains randomly distributed across the Cu surface. These grains continue to grow with time and eventually merge together to form a continuous polycrystalline film. Recent results have shown that the individual graphene grains before the formation of the continuous film can be a four-lobed polycrystalline single-layer, hexagonal single crystal single-layer, or hexagonal single crystal few-layer, depending on CVD parameters.

Grain boundaries in graphene have been known to degrade the electrical and mechanical properties of the film. The polycrystalline nature of CVD graphene grown on Cu can be a problem for graphene-based devices, since it is difficult to avoid grain boundaries in the fabricated graphene devices, especially in the case of device arrays and circuits. It is therefore desirable to synthesize either large-scale, high quality single crystal graphene films, or individual single crystal graphene grains in a controllable arrangement. Some recent work has shown low-pressure CVD synthesis of graphene single crystal domains with sizes up to 0.5 mm on Cu foil. But the lack of control in domain distribution may still limit further applications.

Previously we have demonstrated a method to grow single crystal graphene on Cu by CVD from small graphene flakes, and to synthesize arrays of graphene grains using pre-patterned multi-layer graphene seeds. In that case, however, an extra CVD process was first required to obtain a continuous multi-layer graphene film on Cu used for the following lithographic patterning of the growth seeds (multi-layer graphene). This disclosure includes a more effective approach to control nucleation of CVD graphene by locally providing high concentration of carbon. In one embodiment of this disclosure, a solid carbon source of poly(methyl methacrylate) (PMMA) is used for enhancing local nucleation, and spatially ordered arrays of single crystal graphene grains can be synthesized at pre-determined sites (electron beam lithographically patterned arrays of PMMA dots in some embodiments) on the Cu surface. These grains can be transferred to any substrate for further characterization and device fabrication. These methods of controlling the locations of graphene nucleation and the synthesis of single crystal graphene arrays offer a promising route to fabricating graphene-based devices free of grain boundaries and with more reliable performance.

The extraordinary properties and vast potential applications of graphene extensively stimulate the development of graphene synthesis for a graphene film with controllable layers, large size and low defects density. Recently, the synthesis of graphene has seen significant progress on metal and SiC substrates. Graphene can be synthesized on polycrystalline Cu foil by CVD with controllable layers as thin as monolayer and large size (on the order of 30 inches in diameter). However, defects, especially domain boundaries (DBs), can severely negatively affect the electrical and mechanical properties of electronic materials; and graphene DBs, where the defects concentrate, have not been controlled well during graphene synthesis in the prior art. Furthermore, growth of single-crystalline graphene, which has no DBs, has so far been achieved only on single-crystalline metal substrates, which are hardly available in a large scale. The emergence of single-crystal Si famously propelled the development of the silicon semiconductor industry. As a candidate in the post-silicon era, the synthesis of single-crystalline graphene is also expected to change the scenario of graphene's research and applications. The present disclosure includes methods for the growth of single-crystalline graphene on polycrystalline copper substrates, as well as the growth of single-crystalline graphene into an array.

SUMMARY

Methods and systems are provided for creating regular, addressable arrays of single-crystal graphene islands on a substrate. These methods include providing a substrate made of a suitable material having low carbon dissolvability, and then patterning that substrate with an array of high-carbon-content seeds to serve as nucleation sites. Various methods are presented for producing these seeds. Once the seeds are in place, chemical vapor deposition is performed to allow the growth of graphene islands (substantially single-crystal graphene islands) at the nucleation sites.

BRIEF DESCRIPTION OF THE DRAWINGS

The features, nature, and advantages of the disclosed subject matter will become more apparent from the detailed description set forth below when taken in conjunction with the drawings, in which like reference numerals indicate like features and wherein.

DETAILED DESCRIPTION

Although the present disclosure is described with reference to specific embodiments, one skilled in the art could apply the principles discussed herein to other areas and/or embodiments without undue experimentation.

The present disclosure relates to methods for the fabrication of graphene single crystal islands and arrays thereof on substrate that may be polycrystalline. More specifically, the present disclosure teaches the synthesis of ordered arrays of single crystals made of graphene by the re-growth from pre-patterned seed crystals, offering an approach for the scalable fabrication of single crystal graphene devices while avoiding domain boundaries. Once formed, each of the graphene islands can be individually located, as their positions correspond to those of their pre-patterned seed crystal—which may be tracked and recorded at the time they are initially deposited. This allows for further modification of each of those islands (by depositing more materials, for example) to make devices of desired properties (transistors and other semiconductor devices, for example), and the performance of such devices will not be impaired by the presence of domain boundaries.

One of the embodiments of the present disclosure teaches that islands of graphene single crystals grown on a polycrystalline substrate have the ability to grow across polycrystalline Cu crystal grain boundaries, while preserving their hexagonal shapes. The present disclosure also teaches that the growth mechanism of graphene on polycrystalline Cu substrates greatly differs from that of the known growth mechanism of thin films on substrates. Graphene Single Crystals (GSCs) are able to grow across polycrystalline Cu grain boundaries, suggesting that CVD graphene does not have a definite epitaxial relationship with the underlying polycrystalline Cu crystal, as illustrated in FIGS. 1A-1D. FIG. 1A shows an optical image (scale bar is 25 microns) of as-grown, mostly hexagonally shaped GSC islands on the surface of one polycrystalline Cu substrate. Most of the graphene islands have not grown large enough to merge to each other.

Figure 1B:
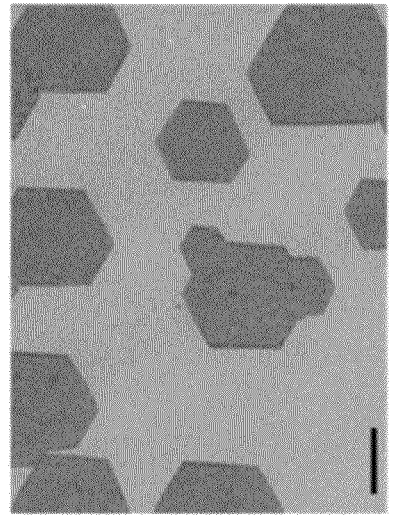
FIGS. 1B-1D are photographs of SEM images of GSC islands on the surface of a polycrystalline Cu substrate.
Figure 1D:
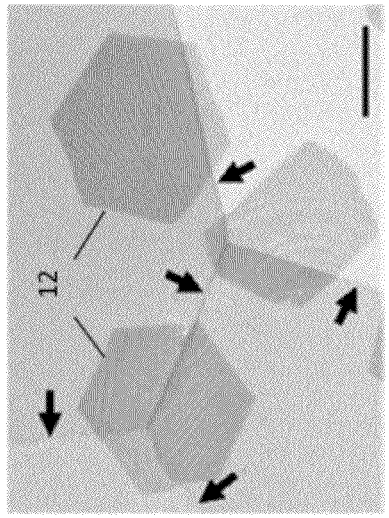
Figure 1A:
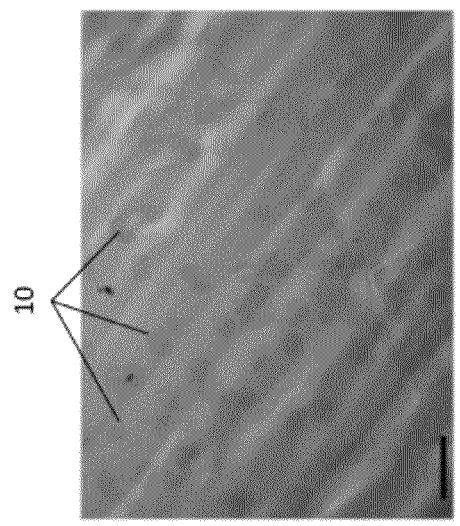
FIG. 1A is a photograph of an optical image of GSC islands on the surface of a polycrystalline Cu substrate.
Figure 1C:
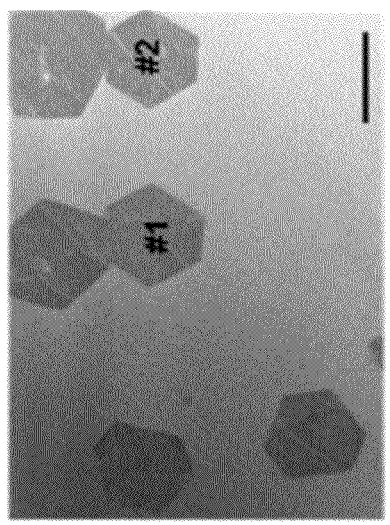

FIG. 1B shows an SEM image (scale bar is 10 microns) of as-grown single-crystal graphene islands (SCGIs) where the edge orientations are approximately aligned with each other. FIG. 1C is an SEM image (scale bar is 10 microns) of as-grown graphene islands where the edge orientations are NOT aligned with each other (except for the two islands labeled as #1 and #2), which indicates a weak interaction between the formed graphene islands and the underlying polycrystalline Cu substrate. It is believed that graphene weakly interacts with the Cu (111) plane by the van der Waals force.

The images in FIGS. 1B and 1C are each taken from within one Cu crystal grain (from a polycrystalline substrate). FIG. 1D is a SEM image (scale bar is 5 microns) showing hexagonally-shaped graphene single crystals 12 grown across polycrystalline Cu crystal grain boundaries (as indicated by the arrows), while preserving their hexagonal shape. Transmission electron microscope (TEM) investigation showed that the hexagonal graphene islands are single crystals and the edges of the islands are along a zig-zag orientation. This discovery allows for the growth of large graphene single crystals on polycrystalline substrates, where the growth is not limited or stopped by the presence of domain boundaries. Finally, the present disclosure demonstrate the fabrication of ordered arrays of graphene single crystals by the re-growth from pre-patterned seed crystals, offering an approach for scalable fabrication of single crystal graphene devices while avoiding domain boundaries.

Another embodiment of the present disclosure includes a method to control the growth of graphene single crystal arrays on a low-carbon-dissolvability substrate. More specifically, this method is based on a seeded growth where arrays of seed crystals are first patterned into a polycrystalline copper substrate by CVD, and then grown by electron beam lithography and oxygen plasma etching, as illustrated in FIGS. 2A-2D.

Figure 2A:
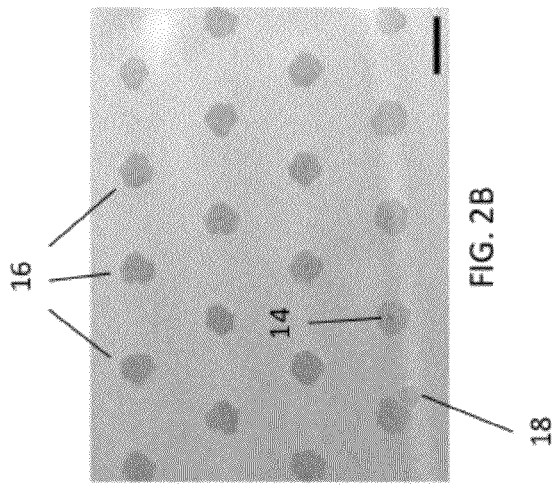
FIG. 2A is a photograph of a SEM image of seed crystals on a Cu substrate.

FIG. 2A shows a SEM image of an array of seed crystals 14 (seen as dots) patterned from a pre-grown multilayer graphene film on a polycrystalline Cu foil by e-beam lithography and plasma etching. The period of the array is 16 microns. The size of each seed crystal is about 500 nm.

Figure 2B:
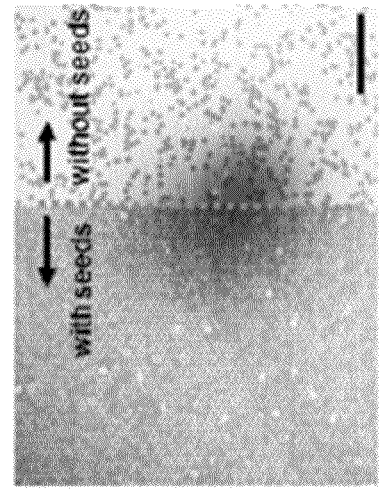
FIGS. 2B-2D are photographs of SEM images of GSCs grown from seed crystals.

FIG. 2B shows a SEM image of a typical GSC array 16 grown from an array of seed crystals, with a relatively short growth time. Seeds 14 can be seen at the centers of many post-grown GSCs. Random-nucleated GSC 18 (not grown from one of the pre-patterned seeds) is also observed, nearby a seeded GSC.

Figure 2C:
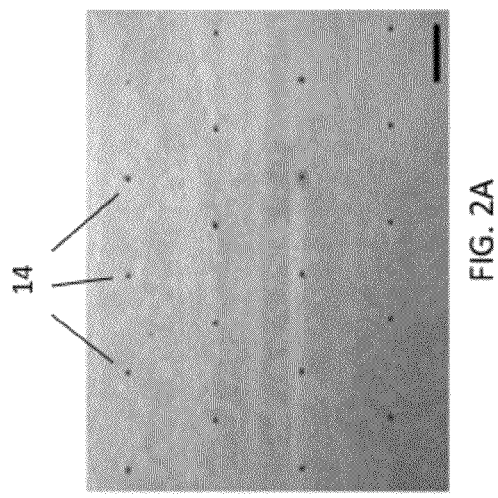

FIG. 2C shows a SEM image of a GSC array from seeded growth similar to FIG. 2B, but with longer growth time. The representative images in FIGS. 2A-2C do not necessarily correspond to the exactly same area on the Cu foil.

Figure 2D:
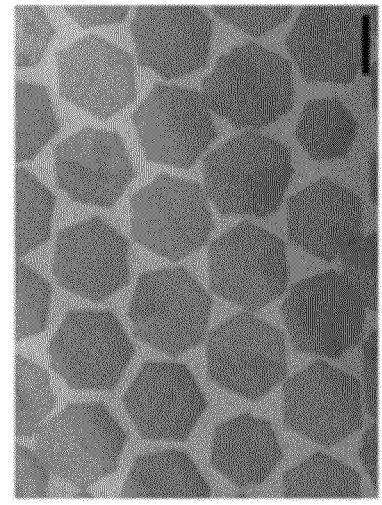

FIG. 2D shows a low-magnification SEM image of a seeded-grown GSC array (left of the dotted line), next to an area without seeds (right of the dotted line). Scale bars in FIGS. 2A-2C are 10 microns, and scale bar in FIG. 2D is 200 microns.

The method of fabrication using seeded growth on a polycrystalline substrate as disclosed herein offers a significant improvement to known growth techniques, as it overcomes the negative effects of domain boundaries on the electronic properties of graphene by avoiding the formation of such domain boundaries. The methods disclosed can be used to grow graphene single crystal arrays on polycrystalline substrates made of copper or any other low-carbon-dissolvability substrate, which can spread over a surface area of $nm^2$ up to $m^2$, depending on the initial seed pattern. In the examples illustrated herein, the fabrication methods lead to the formation of arrays of graphene seeds where the size of each seed is around 500 nm, and the distance between seeds is about 10 to 20 microns (as in FIG. 2), and the area can be as large as 10 $mm^2$ or even larger.

For the growth of an SCGI array from pre-prepared seeds, the concentration of $CH_4$ is decreased to a level as low as 8 ppm and the polycrystalline Cu foil is annealed for 3 hours in order to reduce the formation of defects on polycrystalline Cu surface. After re-growth of graphene in approximately 5 minutes, the SCGI array can be observed, as shown in FIG. 2B. With a longer growth time, each graphene island in the array increases in size, as shown in FIG. 2C.

In the low-magnification image shown in FIG. 2D, we can see the significant difference in SCGI layout and density. In the area with pre-patterned seeds, SCGIs grew in the form of an array. However, in the area without pre-patterned seeds, SCGIs grew at random locations on polycrystalline Cu substrate, and the density of SCGIs is much lower. In the SCGI array, a few SCGIs are missing, appearing as blank areas. It is believed that the missed SCGIs are attributed to the loss of graphene seeds at those locations during the seed preparation. It is also apparent that some SCGIs grew larger and merged into each other in the SCGI array. Fortunately, the merged SCGIs would not affect the addressability of SCGI array. In the case of merged SCGIs, it may be advantageous to form devices away from the grain boundaries between SCGIs, and also away from the exact center of each SCGI to avoid any defects that may be localized around the seed crystal.

Another embodiment of the present disclosure includes a method to prepare an array of seeds. The array of seeds can be prepared by patterning pre-grown graphene or by directly printing carbon-content materials dots on Cu or other metal substrates with low carbon dissolvability. For example, an array of polymer nanodots can be printed on Cu substrates as seeds for the growth of graphene arrays.

Another embodiment of the present disclosure includes a method to grow graphene islands by the chemical vapor deposition of hydrocarbons on polycrystalline Cu substrates at ambient-pressure. The details of one synthesis setup follow.

In the first step of synthesis, a polycrystalline Cu foil (25 micron thick, 99.8%, Alfa) is loaded into a CVD furnace and then heated up to 1050° C. with 300 sccm Ar and 10 sccm $H_2$. After reaching 1050° C., the sample is annealed for 30 minutes without changing the flow rates. The growth is then carried out at 1050° C. under a gas mixture of 300 sccm diluted $CH_4$ balanced by Ar with $CH_4$ concentration of 8 ppm and 10 sccm $H_2$ for 15 min. Finally, the sample is rapidly cooled down to room temperature in the protection of Ar and $H_2$.

Figure 3:
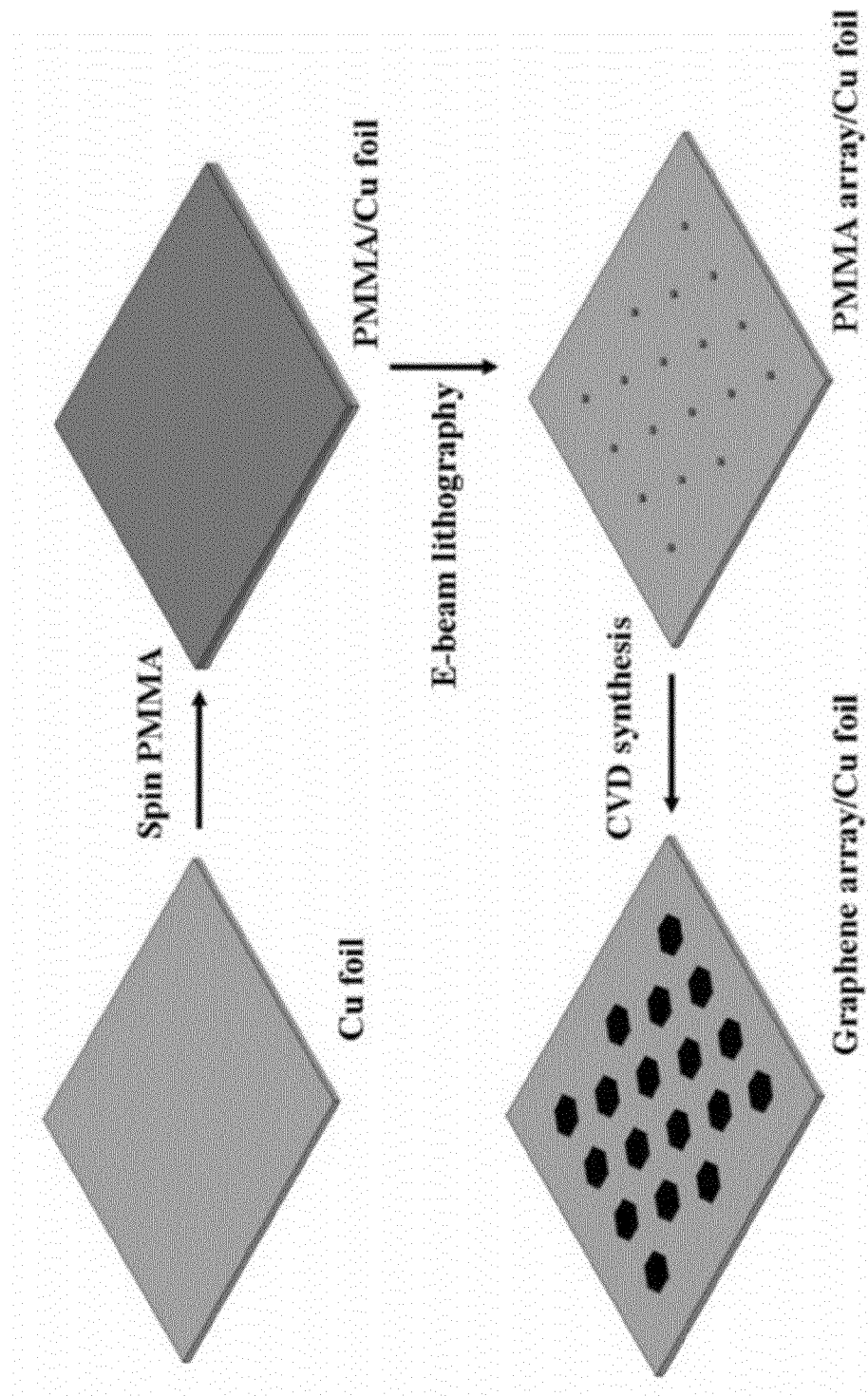
FIG. 3 shows a schematic of one embodiment for growing GSCs on a Cu substrate.

According to another embodiment of this disclosure, graphene may be synthesized by CVD at ambient pressure on Cu foils covered with PMMA dot arrays as shown in FIG. 3. Briefly, (according to one embodiment) annealed Cu foils (25 microns thick) were spin-coated with PMMA film followed by electron beam lithography for patterning dot arrays, and used as substrates. Graphene growth was carried out at 1050° C. under 300 sccm Ar (containing 50 ppm $CH_4$) and 20 sccm $H_2$ for 20 minutes in a CVD system. After growth, the graphene material was transferred onto different substrates by a PMMA-assisted wet-transfer method (an aqueous solution of iron nitrate was used as Cu etchant) for further characterization.

Figure 4:
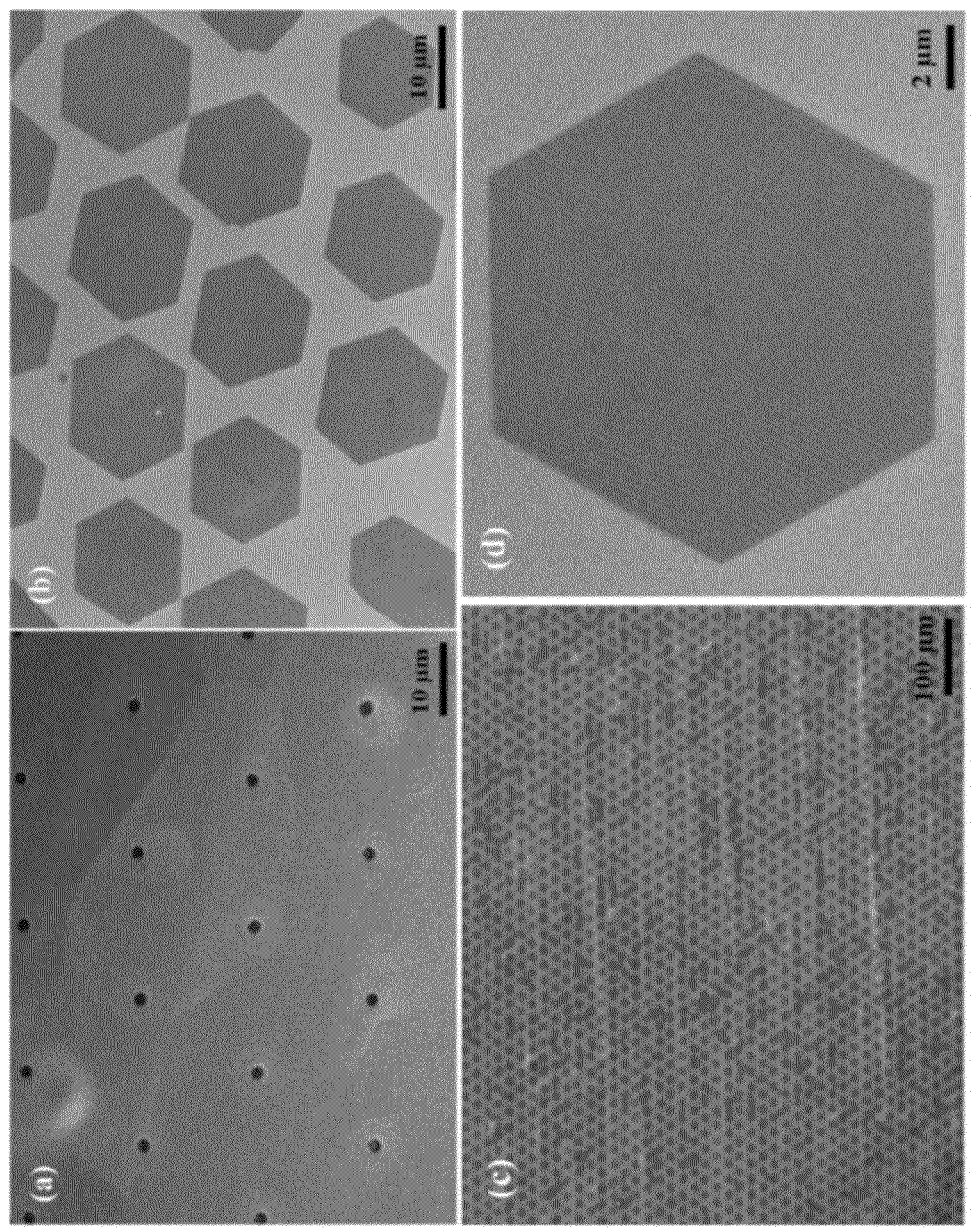
FIG. 4A is a photograph of a SEM image of seed crystals on a Cu substrate.
FIGS. 4B-4C are photographs of SEM images of GSCs grown from seed crystals.
FIG. 4D is a photograph of a SEM image of a single GSC.

FIG. 4A shows a SEM image of PMMA dots on a Cu surface, and FIGS. 4B-4D show graphene grains on Cu after the CVD process. PMMA dots are circles of ~0.8 microns in diameter and with a period of 20 microns (see FIG. 4A). After fabricating the PMMA dot arrays, arrays of graphene grains are grown on the Cu. These grains are observed to have a hexagonal structure with an average size of ~18 microns, defined as the length of the longest diagonals connecting two opposite vertices. The uniform surface contrast in the images indicates the thickness uniformity of the grains.

The hexagonally shaped individual CVD graphene grains (before merging together) are single crystalline, with edges parallel to the zig-zag orientation. FIG. 4D shows an enlarged image of a typical individual graphene grain. The hexagon has well-defined sides, and the underlying microstructures (steps and terraces) of the Cu foil can be observed, but no such features are present in any exposed regions of the foil where graphene has not grown. The exposed regions become oxidized when exposed to air, and have been found to be amorphous. This indicates that the graphene grain is protecting the underlying Cu substrate from oxidation.

After transferring graphene grains from the Cu foil to $SiO_2$, by the PMMA-assisted method, the chosen grains may be protected by negative e-beam resist (MA-N 2403). Everywhere else may then be etched by $O_2$ plasma, to avoid shortening of the electrical contacts by other graphene grains. The electrical contacts (Cr/Au, 5 nm/35 nm, e-beam evaporated) to graphene grains are patterned by e-beam lithography. The detrimental effect of grain boundaries on electronic transport is known, and avoiding grain boundaries is beneficial for improving the mobility. However, the wide variation of $\mu_G$ in different samples and the occasional low $\mu_G$ observed suggest that other sources of disorder could also strongly affect the mobilities. Improving related fabrication processes to reduce such defects will be beneficial to achieve consistent high mobilities in graphene-based devices.

Substrate surface seeding has been a common surface pretreatment method used to modify and control surface nucleation density and rate of diamond films. Seeds (submicron diamond powder/particles) littered on the substrate surface are the predominant nucleation sites and/or are themselves nuclei for immediate growth. In some embodiments of the present disclosure, we apply arrays of PMMA dots to generate graphene nuclei for the growth of single crystal graphene arrays. At high temperature (1050° C.), precursor $CH_4$ is adsorbed on the Cu surface and decomposed to form active carbon species (C adatoms) catalyzed by Cu. Because of the extremely low solubility of carbon in Cu, these formed C adatoms will diffuse largely on the surface and gradually build up the C adatom concentration. Once a supersaturation (locally at the sites of PMMA dots) is achieved, graphene nucleation preferentially occurs on the PMMA sites due to the locally higher concentration of C adatoms, and individual graphene grains grow.

In a general growth process for CVD graphene on Cu substrate (annealed Cu foil, no artificial seeds or pre-patterned solid carbon source), spontaneous nucleation of graphene grains is expected and occurs only when a large C adatom supersaturation has been reached on the Cu surface. The nucleation is believed to be uniform and grains are randomly distributed all over the substrate. The growth of graphene grains then consumes C adatoms, decreasing their concentration, until equilibrium is established among graphene, Cu surface, and the C vapor phase. It has been shown that the C adatom concentration needed for the spontaneous nucleation of graphene grains (on Ru and Ir surfaces, for example) is about twice the equilibrium concentration, and that graphene only grows above equilibrium. Now, by taking advantage of the required large C adatom supersaturation for the spontaneous nucleation, we purposely introduce PMMA dots as designated nucleation sites. Upon $CH_4$ decomposition on Cu, interrupted nucleation of graphene grains preferentially occurs at the PMMA sites occurs because of the locally higher C adatom concentration. It has been demonstrated that polymer films or small molecules (e.g. PMMA, fluorene) are good solid carbon sources for producing high quality graphene.

The amount of PMMA used to generate the nuclei critically influence the graphene nucleation process. High quality arrays of single crystal single-layer graphene grains may be obtained using PMMA dots of ~0.8 micron in diameter and ~0.4 micron in thickness as discussed above. Occasionally, multiple graphene grains (polycrystalline islands) nucleated and grown from one single such nucleus are also observed.

The multi-nucleation of graphene at individual sites is largely related to properties of the PMMA dots.

Figure 5:
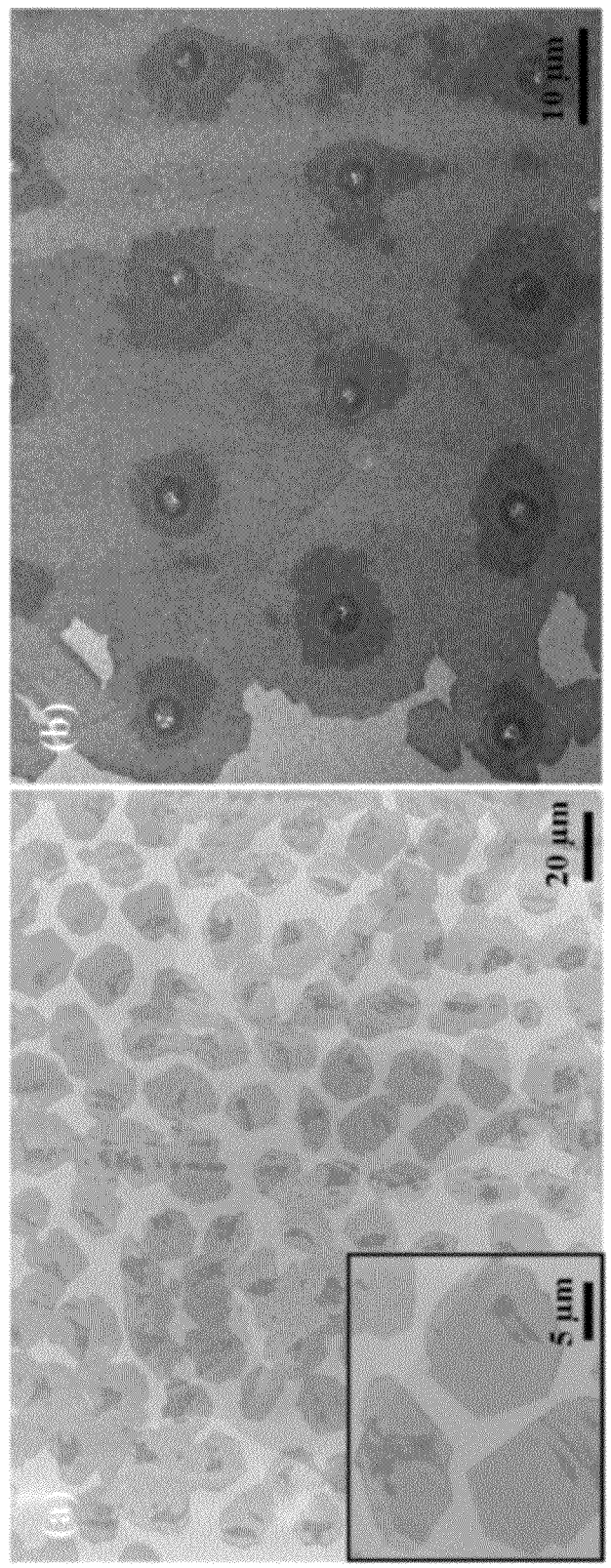
FIGS. 5A-5B are photographs of SEM images of GSCs and a continuous graphene film.

FIG. 5A shows a SEM image of graphene arrays grown from ~2 micron diameter PMMA dots with the same thickness of ~0.4 micron. The individual islands have irregular shapes instead of the hexagonal structures, and mostly can be determined to be polycrystalline consisting of multiple grains (FIG. 5A inset). The dark areas on each island indicate few-layer graphene domains, which are formed from the increased amount of solid carbon precursors (PMMA). When the thickness of the 2 micron diameter PMMA dots increases to ~2 microns, a continuous graphene film with arrays of few-layer domains are formed after the same CVD process (FIG. 5B). Residues of the PMMA after growth can also be clearly observed, shown as light dots in the image. It is believed that the large amount of PMMA has contributed to the growth of this relatively large area film with many thick domains. With careful control of the used amount of PMMA, graphene films with patterned bi- or few-layer domains may be grown.

Figure 6:
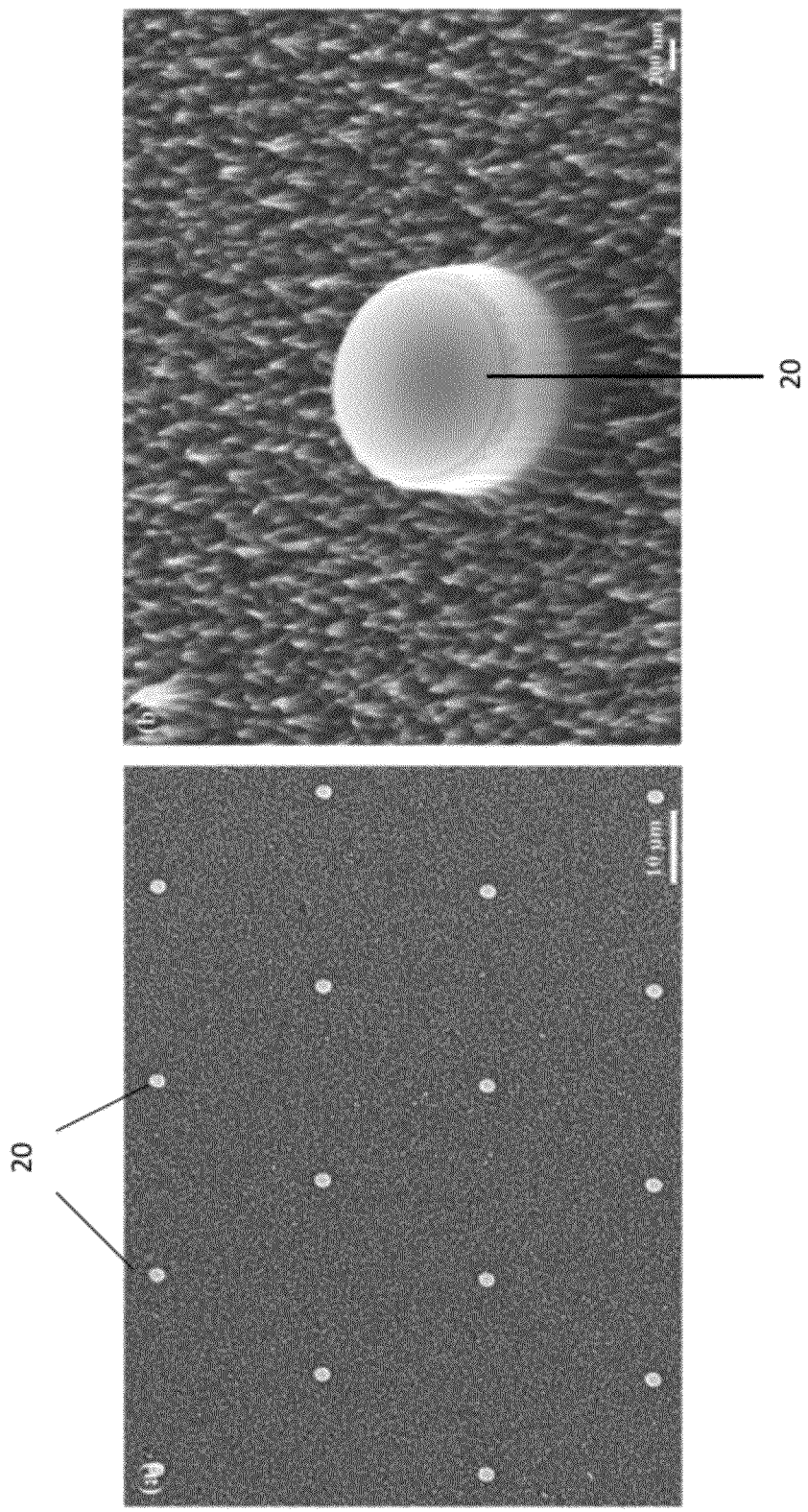
FIGS. 6A-6B are photographs of SEM images of graphite micropillars on HOPG.

Some embodiments of this disclosure include the use of pieces of highly oriented pyrolytic graphite (HOPG) as seeds transferred on Cu foils to grow graphene grains under the same growth conditions as is used in the case of PMMA. An array of graphite micropillars is first fabricated on a HOPG surface in known ways (see FIG. 6, which includes arrays of micropillars 20 with period ~20 microns and individual micropillars with diameter ~1 micron and height ~1.5 micron). Since graphite can be easily cleaved along its basal planes, individual thin plates of multiple or single graphite layers are then transferred onto surfaces of Cu foils, simply by pressing against the patterned HOPG. After the CVD synthesis, a preferential nucleation of graphene on HOPG sites is also observed.

Figure 7:
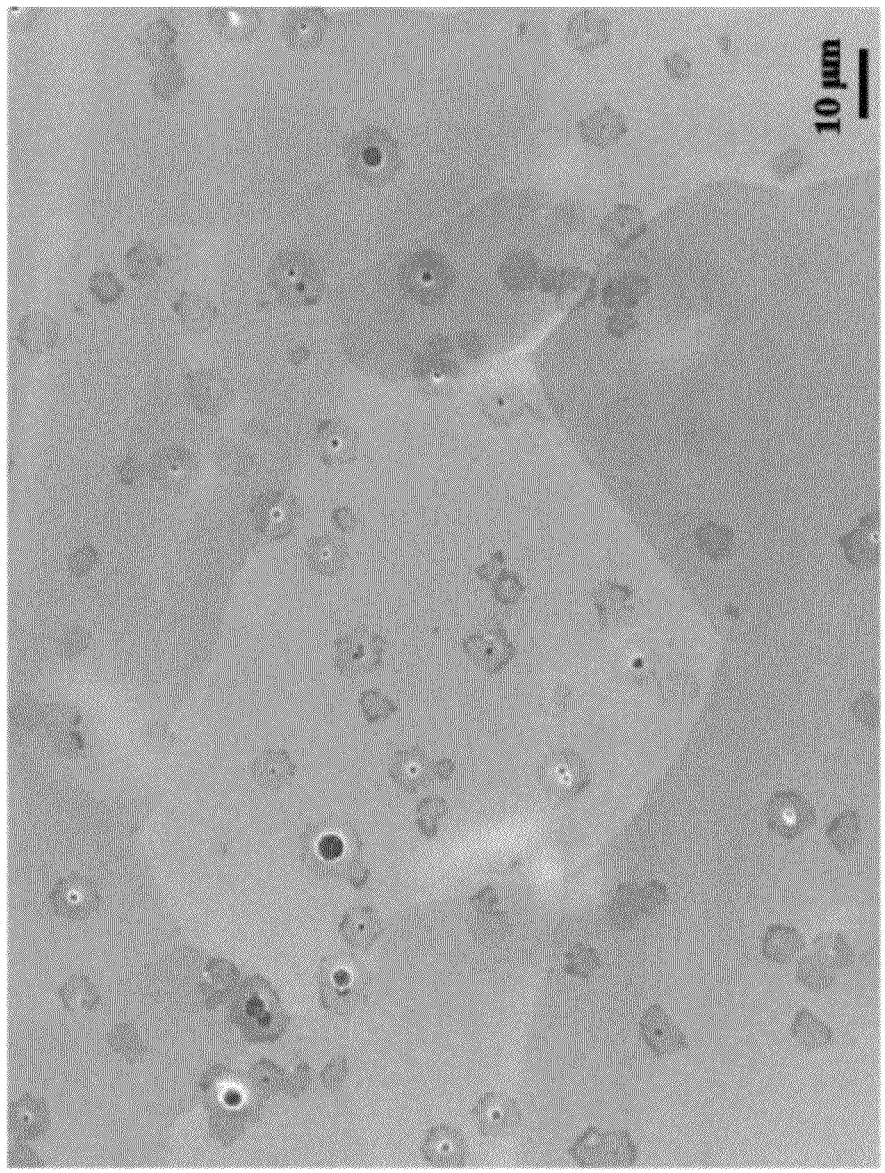
FIG. 7 is a photograph of a SEM image of graphene grains on Cu foil grown from HOPG seeds.

FIG. 7 shows a SEM image of graphene grains on Cu foil grown from HOPG seeds, using the same growth conditions as used in the case of PMMA. Graphene preferentially nucleates and grows at HOPG sites, which are shown as dark dots in FIG. 7.

Due to the roughness and flexibility of the surfaces of such thin Cu foils (25 microns in thickness), transferred graphite plates may differ significantly in size and thickness, which will largely affect graphene growth. In addition, it is difficult to fabricate well-defined arrays of HOPG seeds on Cu surface through the pressing transfer technique.

In order to fully enable one of ordinary skill to practice the methods of the present disclosure, we present the following information about some exemplary setups.

Cu surface pretreatment: Cu foils (25 microns thick, 99.8%, Alfa) were first thoroughly cleaned by acetone, methanol, and DI water, and annealed at 1000° C. for 30 min in the protection of Ar and $H_2$. A thin layer of PMMA (MicroChem 950 PMMA C, 3% in chlorobenzene) was spin-coated on the Cu surface at 3000 rpm for 1 minute, which was then cured at 150° C. for 2 min. The thickness of the PMMA film was ~400 nm. Subsequently, the PMMA coated sample was subject to electron beam lithography where the PMMA was used as a negative resist. After being irradiated by a relatively higher dose, exposed PMMA molecules crosslink with each other to form a network of larger molecules which can remain during the developing process (acetone, methanol, and DI water), while the other unexposed areas will be washed away. A well-defined PMMA dot arrays on Cu surface was then obtained.

Graphene synthesis and transfer: Cu foils covered with PMMA pattern were loaded into a CVD furnace as the growth substrates. Afterwards, the system was thoroughly evacuated by mechanical pump and turbo pump to reach a base pressure of ~$10^{-5}$ Torr, and then quickly back-filled with Ar and $H_2$ to ambient pressure. The furnace was heated up to 1050° C. in 3 hours under 300 sccm Ar and 20 sccm $H_2$. Subsequently, graphene growth was carried out at 1050° C. under a gas mixture of 300 sccm (containing 50 ppm $CH_4$) and 20 sccm $H_2$ for 20 min. Finally, the samples were rapidly cooled down to room temperature in the protection of Ar and $H_2$.

After growth, graphene material was transferred by a PMMA-assisted wet-transfer method onto a 300 nm $SiO_2$/Si wafer for Raman spectroscopy and electrical transport measurements. A thin layer of PMMA (MicroChem 950 PMMA C, 3% in chlorobenzene) was spin-coated on an as-synthesized sample at 3000 rpm for 1 min, which was then cured at 150° C. for 2 min.

Since both Cu surfaces were exposed to $CH_4$, graphene was grown on both sides of the Cu foil. Graphene on the Cu surface without PMMA cover was removed by $O_2$ plasma etching. Subsequently, the sample was placed in an aqueous solution of iron nitrate (0.1 g/ml) to etch off the Cu foil. Typically, the etching process runs overnight. After the Cu foil was completely etched away, graphene with PMMA coating was scooped out from the solution by the transfer substrate. The PMMA was then removed by acetone and the sample was rinsed several times by DI water. During the transfer process, the arrangement of as-synthesized graphene grains was maintained by the supporting PMMA layer. After being transferred onto a target substrate ($SiO_2$/Si in this case), graphene grains were closely attached to the substrate so that they could keep their original arrangement, even when the PMMA was eventually removed.

In summary, this disclosure demonstrates the control of the nucleation of CVD graphene on Cu by pre-patterned solid carbon source, and the growth of arrays of single crystal graphene grains. SEM and Raman spectroscopy characterizations confirm the hexagonal structure and single crystal nature of the graphene grains. Electrical transport measurements show the grains have good mobilities. The methods herein may lead to new technologies for fabricating graphene based devices free of grain boundaries and with better performances.

The present disclosure demonstrates the synthesis of ordered arrays of GSC's by re-growth from pre-patterned seed crystals, offering an approach for scalable fabrication of single crystal graphene devices while avoiding domain boundaries. Each graphene island is a single crystal and every graphene island is of similar size. The size of graphene island arrays can be as small as less than 1 $mm^2$ or as large as several $m^2$. The distance between each GSC island is also adjustable from several micrometers to millimeters. All of the graphene islands are addressable for devices and electrical circuit fabrication.

While this disclosure specifically focuses on a novel synthesis of GSC island arrays on polycrystalline substrate of low carbon dissolvability, one of ordinary skills in the art, with the benefit of this disclosure, would recognize the extension of the approach to other types of ordered arrays.

The present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations based on the details of construction or design herein shown are intended, other than as described in the claims below. It is therefore evident that the particular illustrative embodiments disclosed above may be altered or modified, and all such variations are considered within the scope and spirit of the present disclosure.

What is claimed is:

1. A method for producing an array of single-crystal graphene islands, said method comprising:
   providing a substrate comprising a material having a low carbon solubility at least as low as copper;
   cleaning a surface of said substrate;
   spin-coating a layer of PMMA onto said surface;
   curing said layer of PMMA;
   performing lithography on said layer of PMMA to fix a regular array of PMMA seeds at predetermined locations on said surface;
   using a solvent to remove a portion of said layer of PMMA, said portion comprising substantially all PMMA other than said regular array of PMMA seeds;
   performing chemical vapor deposition on said substrate, said plurality of PMMA seeds serving as nucleation sites; and
   thereby producing a plurality of graphene islands at said predetermined locations, a majority of said graphene islands comprising single-crystal graphene islands.

2. The method of claim 1, wherein said substrate comprises copper.

3. The method of claim 1, wherein said lithography comprises electron-beam lithography.

4. The method of claim 1, further comprising ceasing said chemical vapor deposition before said plurality of graphene islands merge together.

5. The method of claim 1, further comprising allowing said chemical vapor deposition to proceed until said plurality of graphene islands merge together into a single sheet of polycrystalline graphene with grain boundaries at known locations between said predetermined locations.

6. The method of claim 1, further comprising etching away said substrate.

7. A method for producing an array of single-crystal graphene islands, said method comprising:
   providing a substrate comprising a material having a low carbon solubility at least as low as copper;
   cleaning a surface of said substrate;
   fabricating a regular array of graphite micropillars on a highly oriented pyrolytic graphite surface;
   transferring a plurality of graphite seeds from said array of graphite micropillars onto said surface at predetermined locations;
   performing chemical vapor deposition on said substrate, said plurality of graphite seeds serving as nucleation sites; and
   thereby producing a plurality of graphene islands at said predetermined locations, a majority of said graphene islands comprising single-crystal graphene islands.

8. The method of claim 7, wherein said substrate comprises copper.

9. The method of claim 7, wherein said transferring comprises pressing said surface of said substrate against said graphite pillars.

10. The method of claim 7, further comprising ceasing said chemical vapor deposition before said plurality of graphene islands merge together.

11. The method of claim 7, further comprising allowing said chemical vapor deposition to proceed until said plurality of graphene islands merge together into a single sheet of polycrystalline graphene with grain boundaries at known locations between said predetermined locations.

12. The method of claim 7, further comprising etching away said substrate.

13. A method for producing an array of single-crystal graphene islands, said method comprising:
   providing a substrate comprising a material having a low carbon solubility at least as low as copper;
   cleaning a surface of said substrate;
   printing an array of carbon-containing nanodots onto said surface, said nanodots comprising seeds for graphene growth;
   performing chemical vapor deposition on said substrate, said plurality of seeds serving as nucleation sites; and
   thereby producing a plurality of graphene islands at said predetermined locations, a majority of said graphene islands comprising single-crystal graphene islands.

14. The method of claim 13, wherein said substrate comprises copper.

15. The method of claim 13, further comprising ceasing said chemical vapor deposition before said plurality of graphene islands merge together.

16. The method of claim 13, further comprising allowing said chemical vapor deposition to proceed until said plurality of graphene islands merge together into a single sheet of polycrystalline graphene with grain boundaries at known locations between said predetermined locations.

17. The method of claim 13, further comprising etching away said substrate.

* * * * *